UNITED STATES PATENT OFFICE.

WILLIAM J. HOUGH, OF TOLEDO, OHIO.

PROCESS OF TREATING SPENT ALKALINE PULPING LIQUORS.

949,324.　　　　　Specification of Letters Patent.　　Patented Feb. 15, 1910.

No Drawing.　　Application filed May 14, 1908.　Serial No. 432,932.

*To all whom it may concern:*

Be it known that I, WILLIAM J. HOUGH, a citizen of the United States, residing at Toledo, in the county of Lucas and State of Ohio, have invented certain new and useful Improvements in Processes of Treating Spent Alkaline Pulping Liquors, of which the following is a specification.

This invention relates to a method of treating the "spent" liquors resulting from the manufacture of wood pulp by the soda and "sulfate" processes, whereby the organic matter contained in such liquors is recovered.

Wood may be said to consist substantially of water, cellulose, resin and lignin. The two latter substances, together, form about the same portion of the wood as does the cellulose. When wood is pulped by a hot alkaline solution, the resinous and ligneous matters are so affected by the chemical used that they are liquefied, while the cellulose remains practically unaltered as a solid. The alkaline solution containing the resinous and ligneous substances will hereinafter be spoken of as the "spent" liquors. The chemistry of resin and lignin is disputed. As stated, they are dissolved by the hot alkaline solution used in the pulping process. Undoubtedly, resinate and "lignate" of soda are products of this reaction.

My invention consists in neutralizing the "spent" liquors with an acid, whereupon the resin and lignin are precipitated. The precipitate is a pasty mass and can be separated from the solution by the ordinary methods of filtration. It is preferable that the solution be quite hot before filtering, as the precipitated resin and lignin become more solid when the solution is in this condition, the filtration being thus greatly facilitated. The resin and lignin, recovered as described, are not now products of value. However, when destructively distilled, they yield a mixture of creosoting and rosin oil which is particularly of value as a wood preservative. In the process of distillation, large quantities of gas are given off which may be used to furnish heat for the reaction. Of course, in the process of precipitating the resin and lignin, the sodium salt of the precipitating acid is a product. This salt can be recovered by evaporating the solution. When the wood is pulped by the so called "sulfate" or sulfid process, the precipitating reagent is preferably sulfuric acid. When the alkaline liquors are neutralized with this acid, sodium sulfate is a product of the reaction. The sodium sulfate solution may be evaporated to dryness, the salt then ignited with an organic substance, thus reducing the sulfate to the sulfid and hydroxid of soda. These latter salts may then be used on subsequent charges of wood.

Claims.

1. The method described, which consists in treating a "spent" alkaline pulping solution with an acid to precipitate the resinous and ligneous matters contained in such solution.

2. The method described, which consists in treating a "spent" alkaline pulping solution with sulfuric acid to precipitate the resinous and ligneous matters contained in such solution.

In testimony whereof I affix my signature, in presence of two witnesses.

WILLIAM J. HOUGH.

Witnesses:
　R. PEALE HERRICK,
　FRANK J. KENT.